(12) United States Patent
Hegwer

(10) Patent No.: US 11,675,179 B2
(45) Date of Patent: Jun. 13, 2023

(54) ASSEMBLY AND METHOD FOR COLLIMATING A CASSEGRAIN OPTICAL SYSTEM

(71) Applicant: Thomas William Hegwer, Dallas, TX (US)

(72) Inventor: Thomas William Hegwer, Dallas, TX (US)

( * ) Notice: Subject to any disclaimer, the term of this patent is extended or adjusted under 35 U.S.C. 154(b) by 251 days.

(21) Appl. No.: 16/416,053

(22) Filed: May 17, 2019

(65) Prior Publication Data

US 2020/0363621 A1    Nov. 19, 2020

(51) Int. Cl.
*G02B 23/00* (2006.01)
*G02B 7/182* (2021.01)
*G02B 23/02* (2006.01)
*G02B 7/183* (2021.01)

(52) U.S. Cl.
CPC .............. *G02B 23/02* (2013.01); *G02B 7/183* (2013.01); *G02B 7/1824* (2013.01)

(58) Field of Classification Search
CPC ........ G02B 23/00; G02B 23/02; G02B 23/16; G02B 7/00; G02B 7/18; G02B 7/182; G02B 7/1822; G02B 7/003; G02B 7/1824; G02B 7/1825; G02B 7/183; G02B 7/198
USPC .......................... 359/399, 405, 694, 811–882
See application file for complete search history.

(56) References Cited

U.S. PATENT DOCUMENTS

| | | | | |
|---|---|---|---|---|
| 4,039,246 A * | 8/1977 | Voigt | ..................... | F41G 7/2213 359/220.1 |
| 4,466,196 A * | 8/1984 | Woodruff | ............. | G01B 11/275 33/203.18 |
| 5,048,954 A * | 9/1991 | Madey | ................ | G01B 11/275 356/155 |
| 7,595,942 B2 * | 9/2009 | Koenig | .................. | G02B 17/08 359/430 |
| 7,679,845 B2 * | 3/2010 | Wang | ..................... | G02B 7/023 359/822 |
| 8,186,069 B1 | 5/2012 | Ho | | |
| 8,992,032 B2 * | 3/2015 | Glatter | .................. | G02B 23/16 359/872 |

(Continued)

FOREIGN PATENT DOCUMENTS

DE    10 2012 217 838    * 4/2014

*Primary Examiner* — Thong Q Nguyen
(74) *Attorney, Agent, or Firm* — Law Office of Sam Sokhansanj PLLC

(57) ABSTRACT

Disclosed is a novel assembly and method that enables a user to collimate a focused Cassegrain telescope. The assembly, having a secondary mirror and support baffle, comprising an axle, a bearing, and hub, enables a user to precisely rotate or freely spin a Cassegrain telescope's secondary mirror about its optical axis. Incident to freely spinning the telescope's secondary mirror, the user may peer into the telescope's eyepiece and observe a focused image that may wobble, or remain stable, dependent upon how well the telescope's mirrors are aligned. Further, the assembly's eyepiece, comprising a reticle design, enables the observer to measure the magnitude and direction of image shift incident to the secondary mirror spinning. Lastly, the assembly, comprising a radially marked collimating faceplate, and radially marked collimating knob screws, enables a user to make specific adjustments to the telescope's secondary mirror, compensating for the observed image shift, precisely collimating the telescope.

12 Claims, 25 Drawing Sheets

(56) References Cited

U.S. PATENT DOCUMENTS

| | | | | |
|---|---|---|---|---|
| 9,151,570 B2* | 10/2015 | Plaster | .................... | F41G 1/38 |
| 9,769,432 B2* | 9/2017 | Barthe | .................. | H04N 7/183 |
| 2003/0179376 A1 | 9/2003 | Houde-Walter et al. | | |
| 2005/0248684 A1* | 11/2005 | Machida | ................ | G03B 17/00 |
| | | | | 396/533 |
| 2012/0050894 A1* | 3/2012 | Honma | ................ | G02B 7/023 |
| | | | | 29/428 |

* cited by examiner

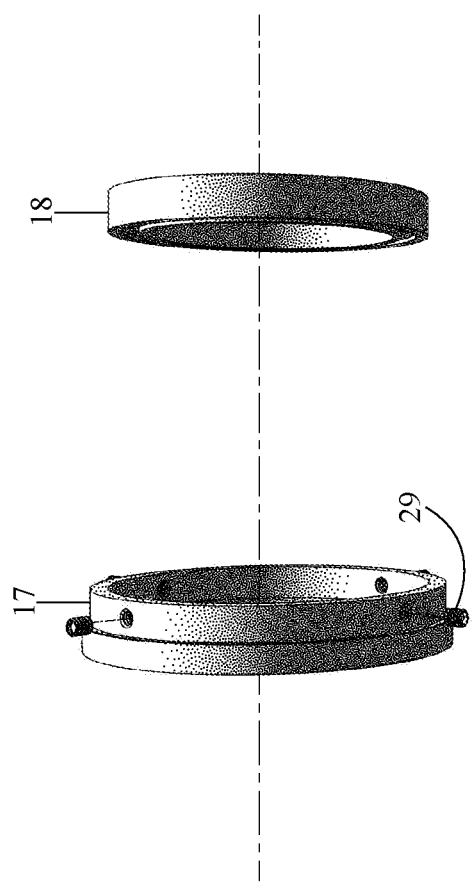
FIG. 32
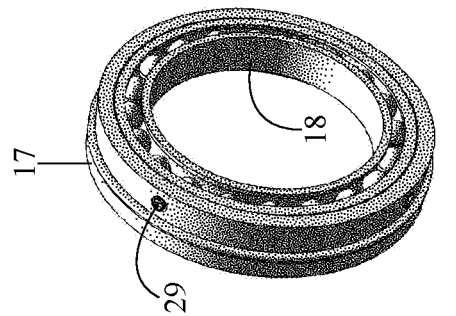
FIG. 35
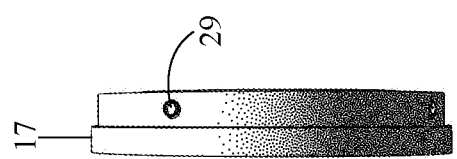
FIG. 34
FIG. 33

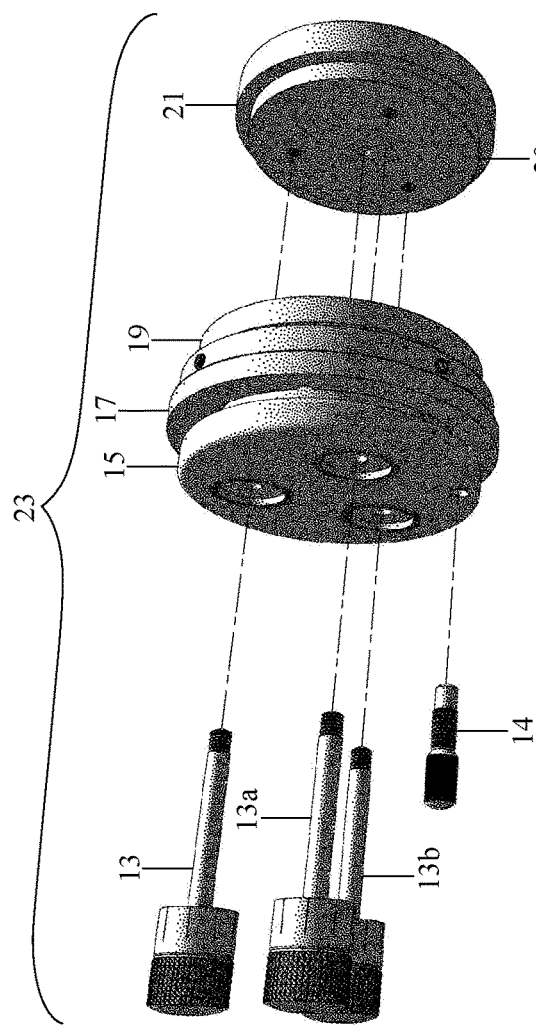
FIG. 40
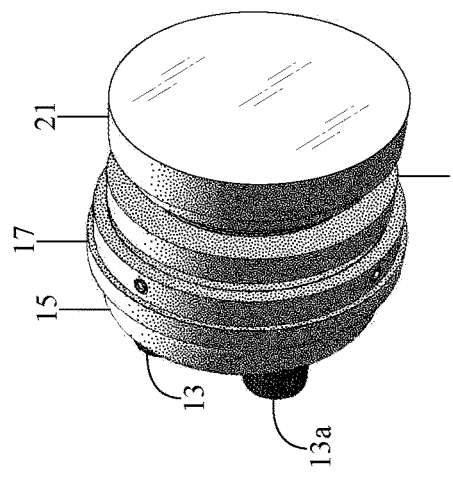
FIG. 43
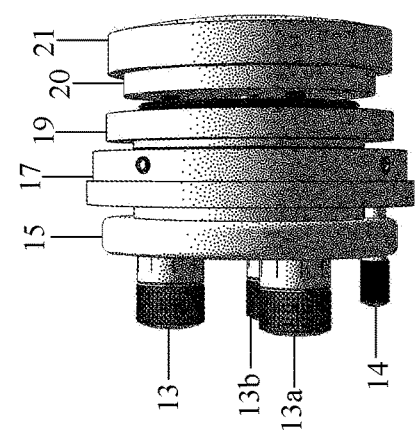
FIG. 42
FIG. 41

ASSEMBLY AND METHOD FOR COLLIMATING A CASSEGRAIN OPTICAL SYSTEM

BACKGROUND OF THE INVENTION

This present invention relates generally to optical imaging systems, and more specifically to the collimation of Cassegrain optical systems.

A Cassegrain telescope is comprised of two mirrors that are spatially oriented in opposition to one another. The mirrors' orientation allows the telescope's optical path to fold back onto itself so that incident light rays are focused through a bored primary mirror and into the observer's eyepiece. The image produced is viewed at the rear of the telescope. To produce a high-quality observable image, a Cassegrain telescope's mirrors must be well-aligned. If the telescope's mirrors are not well-aligned, the focused image will appear poor and degraded, suffering from various optical aberrations. FIG. 1 illustrates the optical path of incident light rays 1 for a specific type of Cassegrain reflecting telescope, a Schmidt-Cassegrain 6. The telescope utilizes three elements to produce a focused image 5: an aspherical Schmidt corrector plate 2, a concave spherical bored primary mirror 3 and a convex spherical secondary mirror 4. The aspherical corrector plate 2 is required to produce a high-quality image as it compensates the incident light rays 1 for the concave spherically shaped primary mirror 3. FIG. 2 illustrates the optical light path of incident light rays 1 for a classical Cassegrain 9 reflecting telescope. Unlike the Schmidt-Cassegrain 6, the classical Cassegrain 9 does not require the addition of a correcting lens to the optical path to produce a high-quality focused image 5 as its mirrors employ a more sophisticated and expensive design: a bored primary mirror 7 that is concave paraboloidal in shape and a secondary mirror 8 that is convex hyperboloidal shape. Cassegrain telescopes fasten the secondary mirror to a rotationally static assembly that is directly opposite and center of the primary mirror, which is also rotationally static. Three screws found on the secondary mirror assembly may be tightened or loosened to adjust the mirror's orientation and the telescope's collimation.

To date, two primary methods have been utilized to collimate a Cassegrain telescope. The first and most widely utilized, known as the 'star test', requires the observer to center a bright star from the nighttime sky into the telescope's eyepiece and slightly defocus the image. If the telescope is well-collimated, the slightly defocused star's image will band into multiple discreet rings that are concentric about the star's center (FIG. 3); this image is known as the 'Airy disk'. Conversely, if the telescope is poorly collimated, the Airy disk's discreet rings will not be concentric about the star's center and appear stretched or distorted (FIG. 4). The direction and severity of the Airy disk's distortion is dependent upon how well or how poorly the secondary mirror is aligned to the telescope's primary mirror. For a telescope that is producing a poor image and distorted Airy disk, the observer is required to loosen or tighten the collimating screws to correctly align the secondary mirror with the primary mirror, to produce a concentric Airy disk.

Several challenges are presented to the amateur astronomer who is attempting to utilize the star test method to collimate their telescope. Firstly, the object star must be centered, and remain centered in the telescope's eyepiece throughout the collimating process, to produce the most accurate outcome. As the Earth is rotating and constantly changing the star's position in the telescope's eyepiece, this task is best accomplished with the aid of a computer guided mount which is often expensive. Concurrent to keeping the star well-centered, the observer must simultaneously tighten or loosen specific collimating screws at the front of the telescope while constantly assessing the Airy disk image for changes made. This back-and-forth action while keeping the star well-centered can prove challenging. Compounding the difficulty of this approach, if atmospheric conditions are not ideal for viewing and are the source of additional visual aberrations, the observer may not be able to fully visualize the Airy disk and discern if the mirrors of the telescope are indeed in correct alignment. Because of these issues, many amateur astronomers utilize an artificial star to collimate their telescopes.

An artificial star mimics a real star via a white LED light, which may be used indoors, and turned up or down in brightness to simulate the various intensities of light emitted in the nighttime sky by a real star. The method for collimating the telescope using an artificial star is identical to that of a real star. The artificial star is centered in the eyepiece and then slightly defocused to observe the Airy disk while the collimating screws are concurrently tightened or loosened until a concentric Airy disk is produced. Utilizing a static artificial LED star to collimate a telescope is often easier than utilizing a real shifting star in the nighttime sky, but it can still be difficult to discern if the telescope has achieved its best collimation. Further and irrespective of the star type used, the observer can often make minor tightening or loosening adjustments to the collimating screws of a well-collimated telescope and be unable to discern changes to the Airy disk. However, subtle changes are occurring to the secondary mirror's orientation, but the observer cannot discern if these minor changes are improving or degrading the image. The star test method has reached the edge of its limits but improvements to the telescope's collimation may still be realized.

The second method for collimating a Cassegrain telescope involves the use of a multi-beam laser optical alignment device. The collimating device utilizes three red lasers that are simultaneously illuminated onto a target alignment display after reflecting off the telescope's primary and secondary mirrors. The user may subsequently adjust the secondary mirror's orientation via its collimating screws to align the three lasers onto the target display in a specific pattern to successfully collimate the telescope. While this method yields excellent results, the technology is expensive and best suited to be performed indoors. If a telescope loses its collimation while in the field and the laser collimator equipment is not immediately available, the observer will have to rely upon the star test to collimate their telescope. Additionally, the observer cannot know in absolute terms, as measured in arc minutes, how accurately the telescope is collimated.

Lastly, even when the mirrors on a Cassegrain telescope are well-aligned, certain visual aberrations can still exist. These aberrations may be the direct result of shortcomings in the telescope's optical design, quality of optics, or stem from poor atmospheric seeing conditions. For the amateur astronomer who is viewing the nighttime sky and still contending with visual aberrations after collimating their telescope, it can be difficult to know if indeed the mirrors are well-aligned and ruled out as the source of any visual aberrations. Because of the limitations described, there exists a need within the amateur astronomical community for innovation in both equipment design and methods for collimating a Cassegrain telescope.

BRIEF SUMMARY OF THE INVENTION

In one embodiment, the present invention is an assembly enabling the secondary mirror on a Cassegrain telescope to be precisely rotated or freely spun by hand about the telescope's optical axis. The assembly, having a secondary mirror and support baffle, comprising an axle, a radial bearing, a hub, a collimating faceplate, collimating knob screws and a rotational lock screw, is fixated and centered about the telescope's optical tube. The axle, bearing, and hub, comprising the invention, enable the user to rotate the telescope's secondary mirror about its optical axis; if desired, the mirror may be precisely rotated by hand, or at several rpm, should the user quickly apply a rotational force with their hand and allow the mirror to freely spin. Further, the rotational lock screw, which is fastened through the collimating faceplate into the hub, may be either engaged or disengaged, enabling the user to either lock the assembly firmly in place or freely rotate it as required.

In one embodiment, the present invention is an assembly enabling the user to make specific adjustments, of a known quantity, to the alignment of the telescope's secondary mirror about its optical axis. The collimating knob screws and collimating faceplate, comprising the assembly, each possess a plurality of radial markings that may be cross-indexed against each other. When cross-indexed against each other during the collimating process, the radial markings, designated in units of arc minutes, enable the user to make specific and incremental positional changes to the telescope's secondary mirror.

In one embodiment, the present invention is an assembly that enables the user to determine the exact degree of misalignment between the telescope's mirrors during the collimation process. The assembly, having telescope eyepieces of various magnifying powers, is comprised of a reticle design that, when viewed incident to the telescope's secondary mirror being precisely rotated or freely spun, allows the user to know the exact degree of misalignment, measured in arc minutes, between the telescope's mirrors.

In one embodiment, the present invention is a method enabling a user to precisely collimate a focused Cassegrain telescope, without reliance upon: a real star in the nighttime sky to perform a star test, an artificial star to perform a star test, defocusing the telescope in any manner, a laser alignment device, or other external collimating devices or methods. Additionally, collimating a telescope with the disclosed assembly and method may be performed either indoors or outdoors and, in the day, or night. The method is best practiced by a user initially pointing their telescope at a scene of interest and aligning a conspicuous object into the center of the eyepiece's reticle design. Next, the user will rotate the telescope's secondary mirror 180° and view the subsequent scene through the telescope's eyepiece, assessing the conspicuous object for shift against the reticle design. Knowing the magnitude and direction the image has shifted in arc minutes, and the corresponding correction required to collimate the telescope, the user may now adjust the requisite collimating knob screws to align the telescope's mirrors. Upon collimating the Cassegrain telescope, the observer can spin the secondary mirror at several rpm, allowing it to freely rotate on its own for several seconds, and observe an image that has no discernable shift or wobble to it at any useful magnification the telescope may achieve.

BRIEF DESCRIPTION OF THE DRAWINGS

An exemplary embodiment of the present invention is illustrated by way of example in the accompanying drawings in which like reference numbers indicate the same or similar elements and in which:

FIG. 32 illustrates a perspective assembly diagram of the invention's hub and radial bearing.

FIG. 33 illustrates an anterior perspective view of an assembled hub and radial bearing from FIG. 32.

FIG. 34 illustrates a lateral perspective view of an assembled hub and radial bearing from FIG. 32.

FIG. 35 illustrates a posterior perspective view of an assembled hub and radial bearing from FIG. 32.

FIG. 40 illustrates a perspective assembly diagram of the invention's collimating knob screws, rotational lock screw, collimating faceplate, hub, flanged retention ring, mirror base plate and secondary mirror.

FIG. 41 illustrates an anterior perspective view of a fully assembled rotational collimating assembly from FIG. 40.

FIG. 42 illustrates a lateral perspective view of a fully assembled rotational collimating assembly from FIG. 40.

FIG. 43 illustrates a posterior perspective view of a fully assembled rotational collimating assembly from FIG. 40.

DETAILED DESCRIPTION OF THE INVENTION

Figure 1:
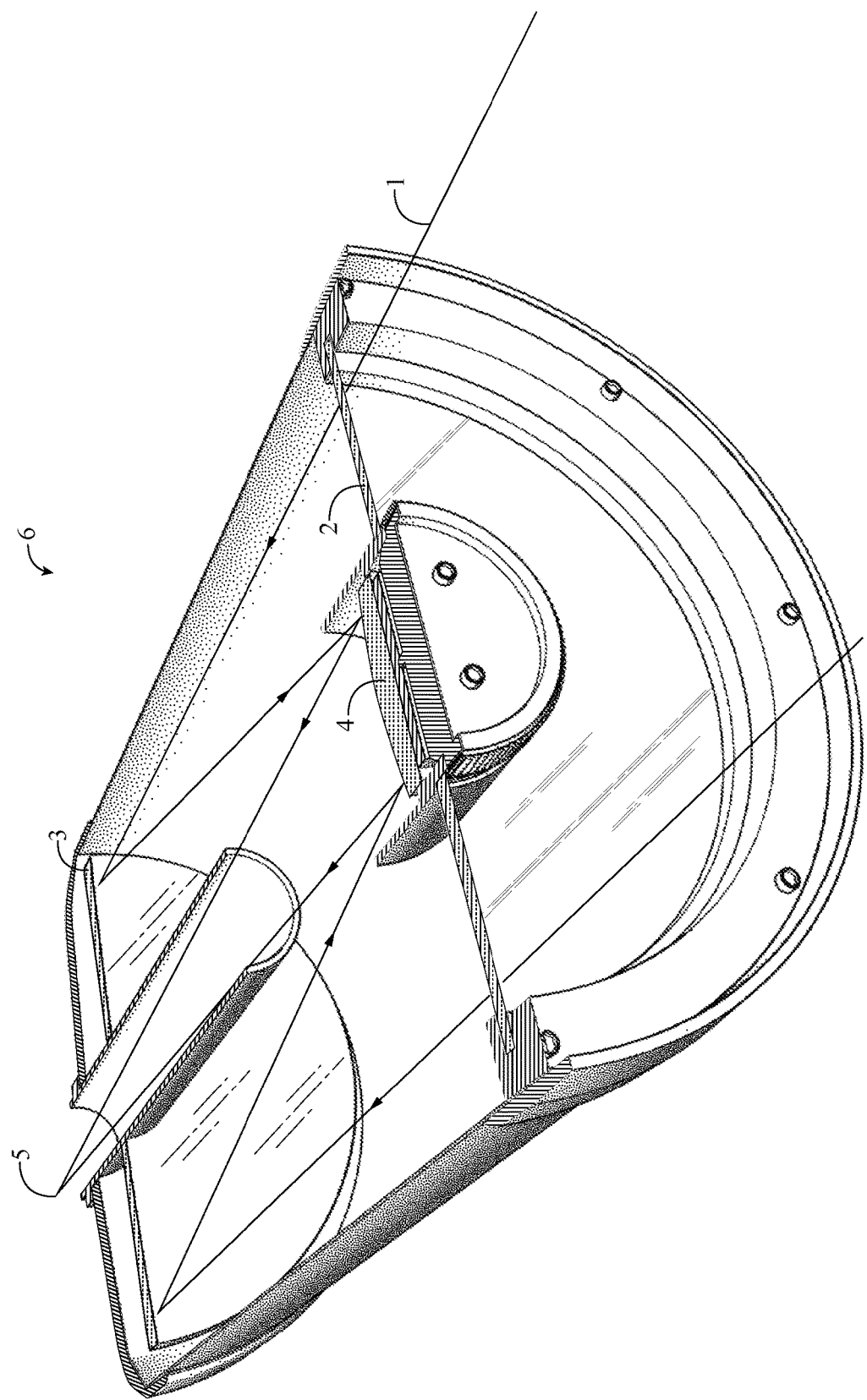
FIG. 1 illustrates an incident light ray path diagram for a Schmidt-Cassegrain telescope.
Figure 2:
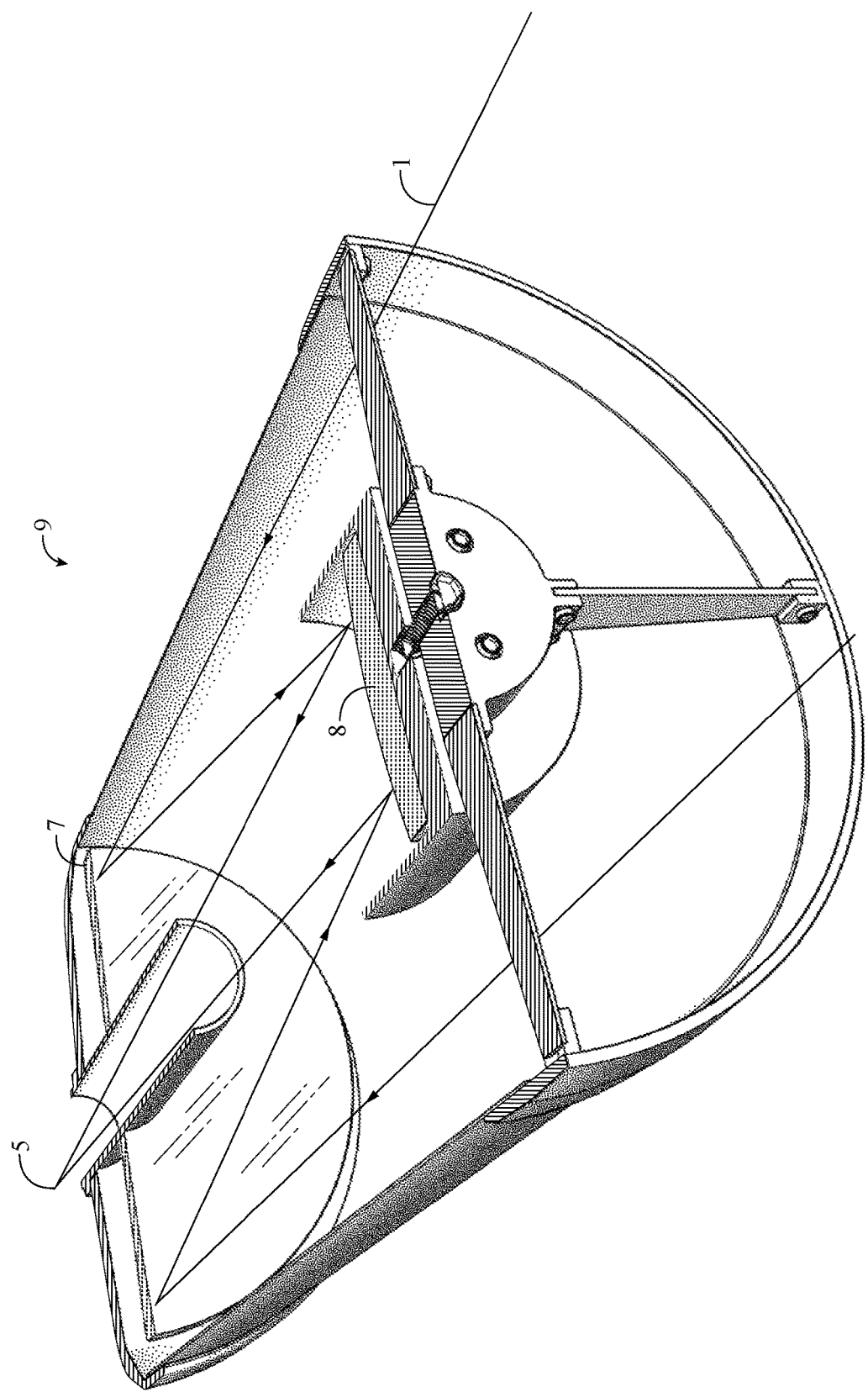
FIG. 2 illustrates an incident light ray path diagram for a classical Cassegrain telescope.
Figure 3:
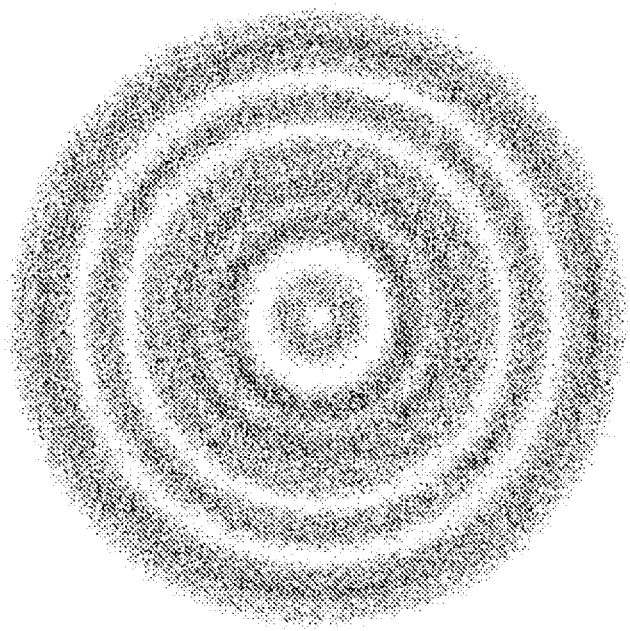
FIG. 3 illustrates a well-formed concentric Airy disk viewed through the eyepiece of a well-collimated Cassegrain telescope.
Figure 4:
FIG. 4 illustrates a poor distorted Airy disk viewed through the eyepiece of a poorly collimated Cassegrain telescope.
Figure 5:
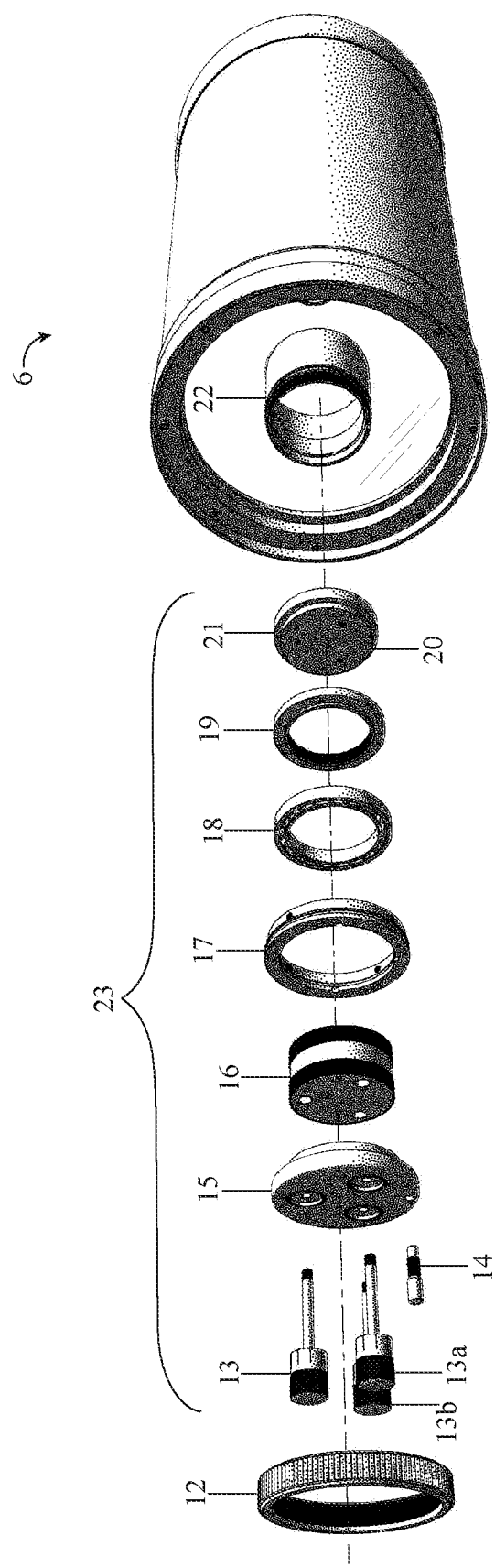
FIG. 5 illustrates a perspective view of the free-spinning secondary mirror assembly disclosed in this invention for a Schmidt-Cassegrain telescope.

Referring now to the drawings which detail the disclosed invention and its various embodiments, FIG. 5 is a perspective view of the disclosed rotational collimating assembly 23 and its centered position about the telescope's optical axis. The knurled retention ring 12 securely fastens the entirety of the rotational collimating assembly 23 inside the telescope's secondary baffle 22; its point of compression for fastening the rotational collimating assembly 23 into the secondary baffle 22 is at the perimeter of the hub 17. The collimating knob screws, 13, 13a and 13b, are inserted through the collimating faceplate 15, axle 16 and entirety of the assembly to fasten the secondary mirror's baseplate 20 to a central balance point 27 (shown in FIG. 15) found on the posterior face of the axle 16; the secondary mirror 21 is attached to its baseplate 20 by an adhesive strip. Adjustment to the secondary mirror's collimation is accomplished by either tightening or loosening the collimating knob screws, 13, 13a and 13b. A rotational lock screw 14 may be engaged or disengaged at a lock point 28 (shown in FIG. 28) on the assembly's hub 17 allowing the assembly to either freely rotate or be rotationally locked as the user requires. The anterior face end of the collimating faceplate 15 provides insertion passages and support for the assembly's collimating knob screws, 13, 13a and 13b, and rotational lock screw 14. When the rotational lock screw 14 is disengaged from its lock point 28 on the hub 17, the peripheral edge of the collimating faceplate 15 allows the user to freely rotate the secondary mirror 21 about the telescope's optical axis with their hand. The posterior face of the collimating faceplate 15 is a fastening point for the anterior face of axle 16. Securely fastened to the posterior face of the collimating faceplate 15, the axle 16 allows the assembly to freely rotate supported by the inner race of the radial bearing 18. Further, the radial bearing 18 is nested inside the hub 17; the outer race of the radial bearing 18 is securely fastened in this nested position by four set screws 29 (shown in FIG. 32) found about the hub's perimeter allowing the inner race of the radial bearing 18 to freely rotate. Lastly, the flanged retention ring 19 threads onto the posterior face of the axle 16, with its flange 30 compressing against the inner race of the radial bearing 18 firmly holding all of the components in place. To further illustrate the details of the above discussion and the perspective view of FIG. 5, FIG. 6 through FIG. 27 provide a sequential detailed perspective view of each component, while FIG. 28 through FIG. 47 provide a sequential detailed view of component assembly and interaction.

Figure 8:
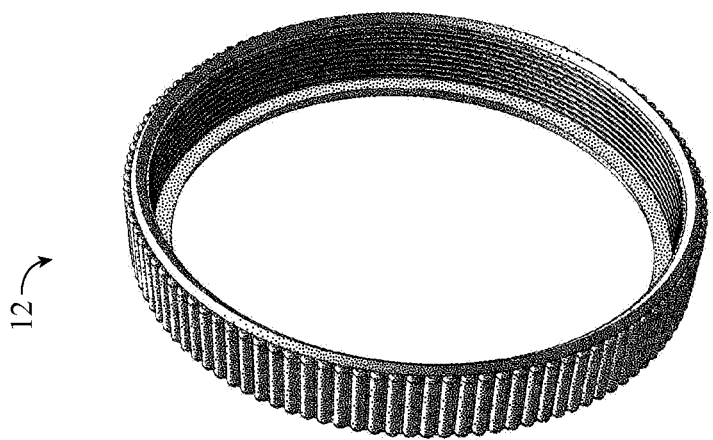
FIG. 8 illustrates a posterior perspective view of the invention's knurled retention ring.
Figure 7:
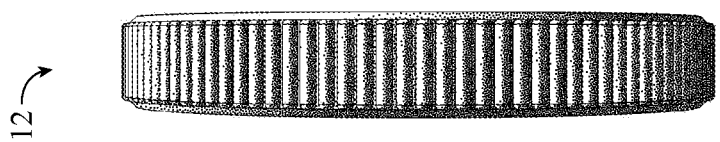
FIG. 7 illustrates a lateral perspective view of the invention's knurled retention ring.
Figure 6:
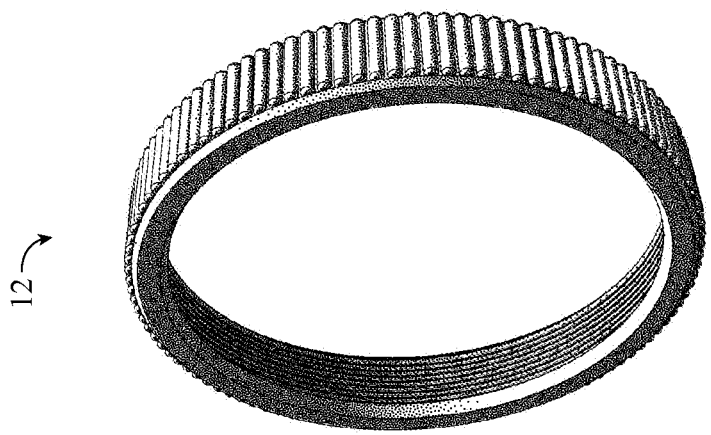
FIG. 6 illustrates an anterior perspective view of the invention's knurled retention ring.
Figure 9:
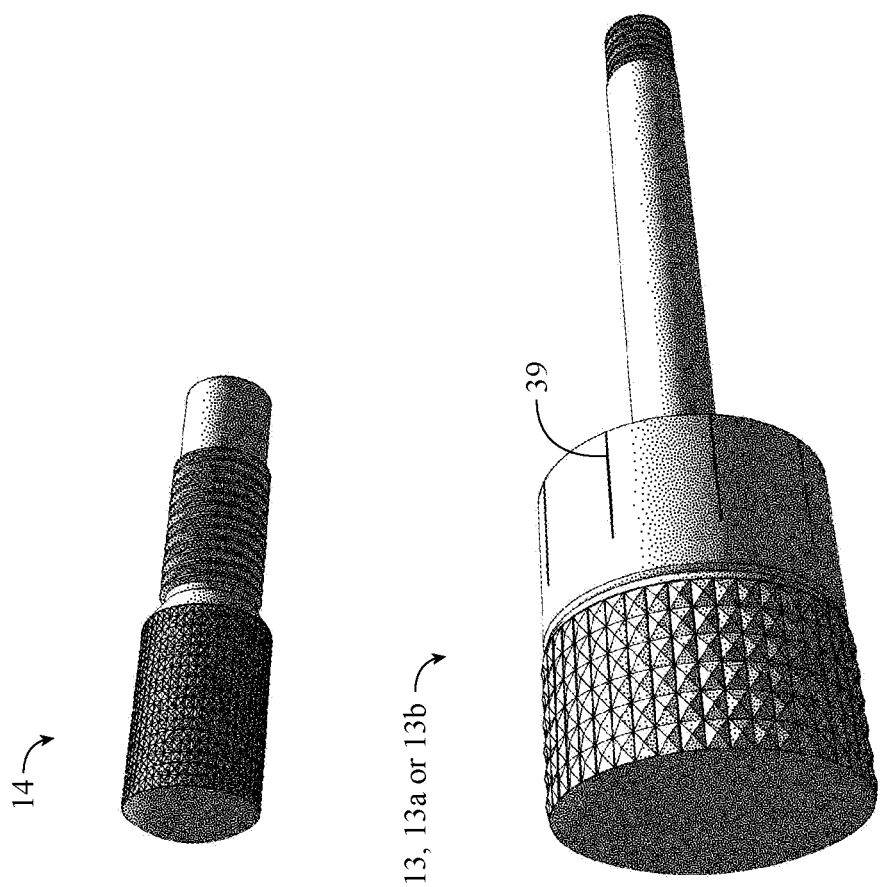
FIG. 9 illustrates a perspective view of the invention's rotational lock screw and collimating knob screws.
Figure 12:
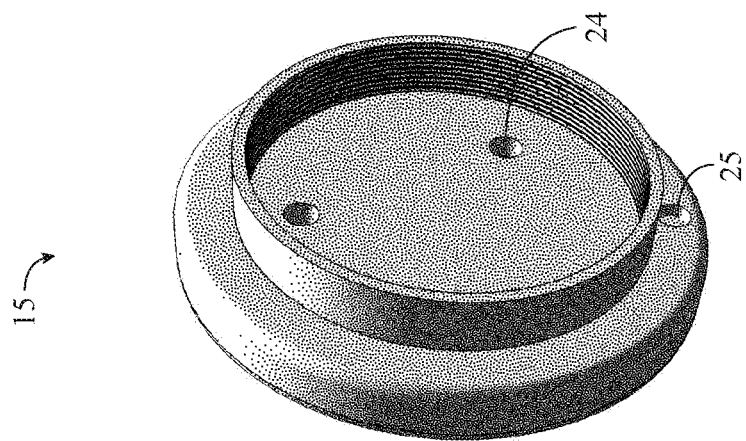
FIG. 12 illustrates a posterior perspective view of the invention's collimating faceplate.
Figure 11:
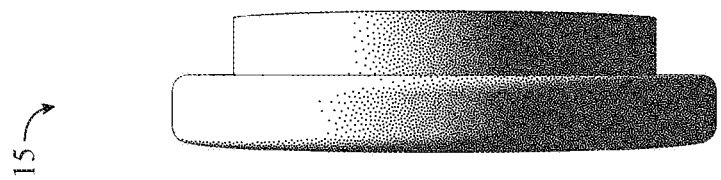
FIG. 11 illustrates a lateral perspective view of the invention's collimating faceplate.
Figure 10:
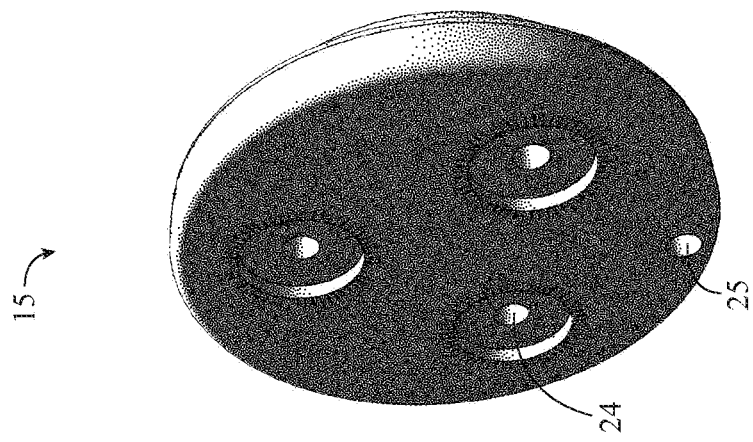
FIG. 10 illustrates an anterior perspective view of the invention's collimating faceplate.
Figure 15:
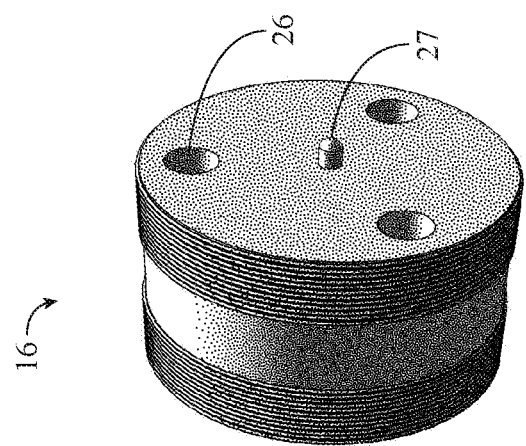
FIG. 15 illustrates a posterior perspective view of the invention's axle.
Figure 14:
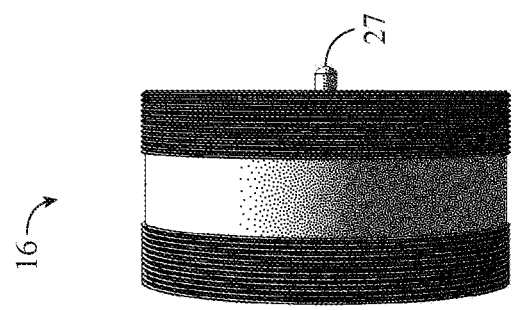
FIG. 14 illustrates a lateral perspective view of the invention's axle.
Figure 13:
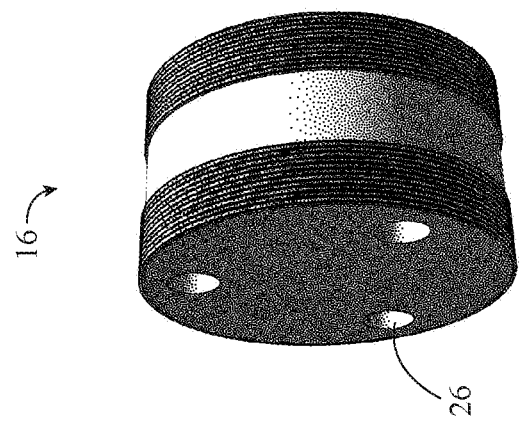
FIG. 13 illustrates an anterior perspective view of the invention's axle.
Figure 18:
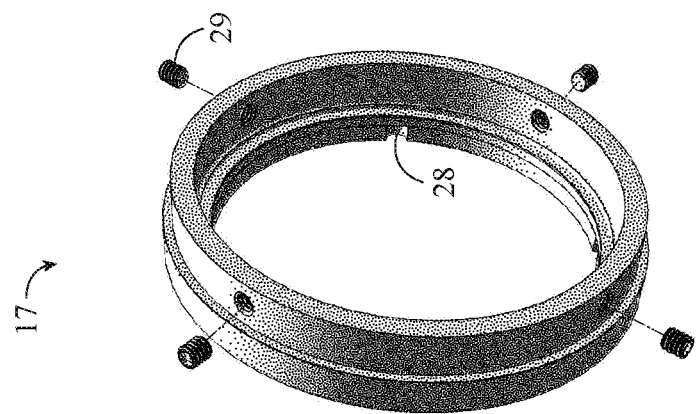
FIG. 18 illustrates a posterior perspective view of the invention's hub.
Figure 17:
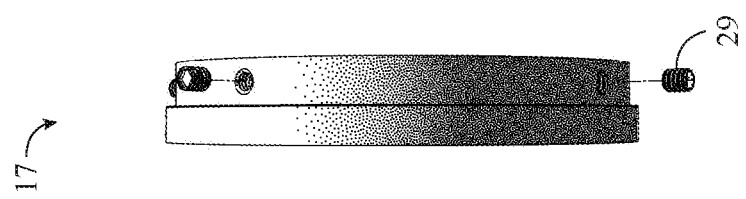
FIG. 17 illustrates a lateral perspective view of the invention's hub.
Figure 16:
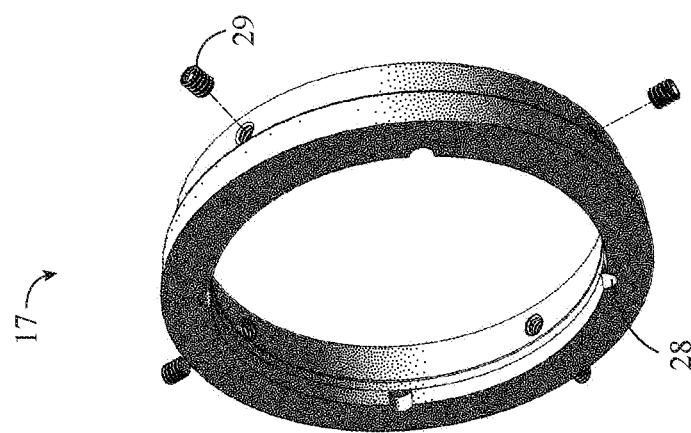
FIG. 16 illustrates an anterior perspective view of the invention's hub.
Figure 21:
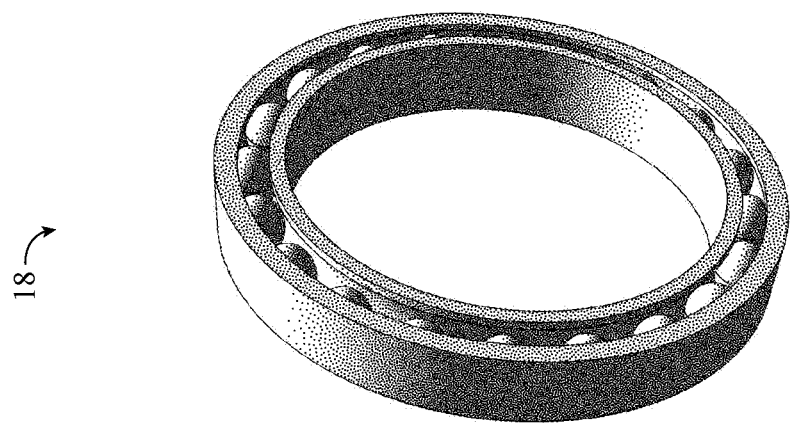
FIG. 21 illustrates a posterior perspective view of the invention's radial bearing.
Figure 20:
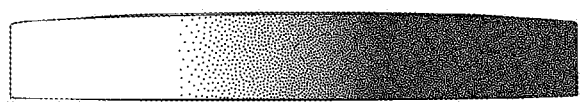
FIG. 20 illustrates a lateral perspective view of the invention's radial bearing.
Figure 19:
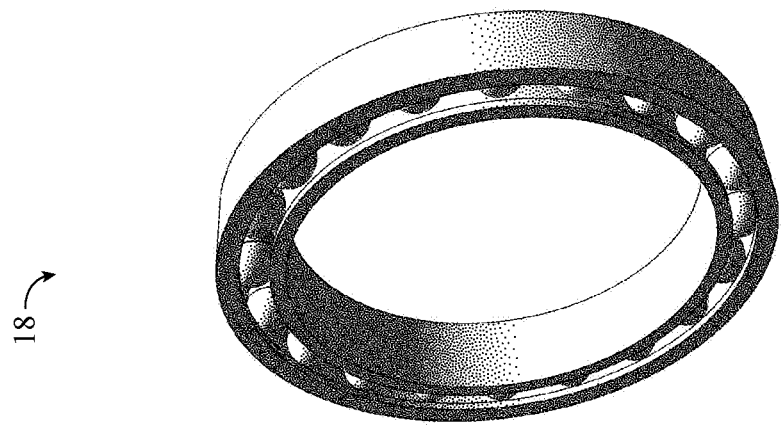
FIG. 19 illustrates an anterior perspective view of the invention's radial bearing.
Figure 24:
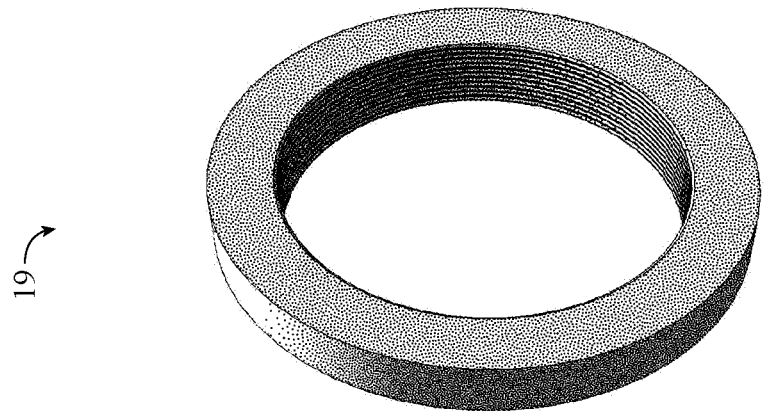
FIG. 24 illustrates a posterior perspective view of the invention's flanged retention ring.
Figure 23:
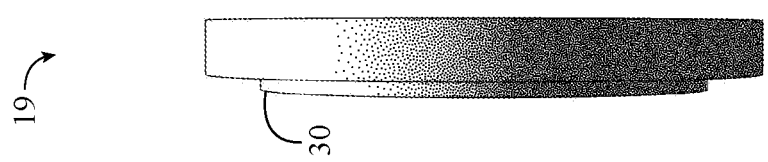
FIG. 23 illustrates a lateral perspective view of the invention's flanged retention ring.
Figure 22:
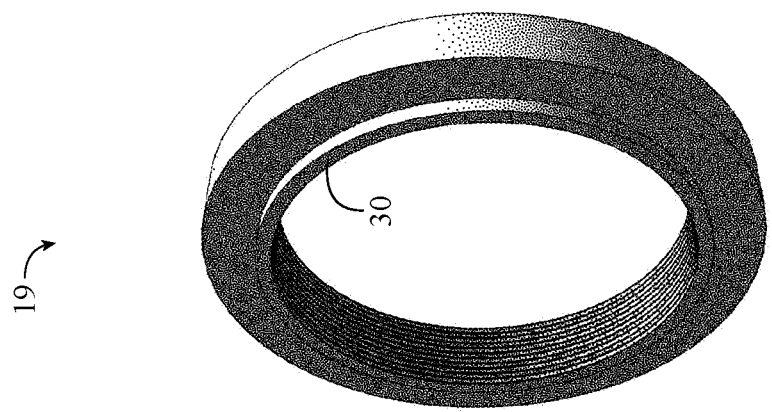
FIG. 22 illustrates an anterior perspective view of the invention's flanged retention ring.
Figure 27:
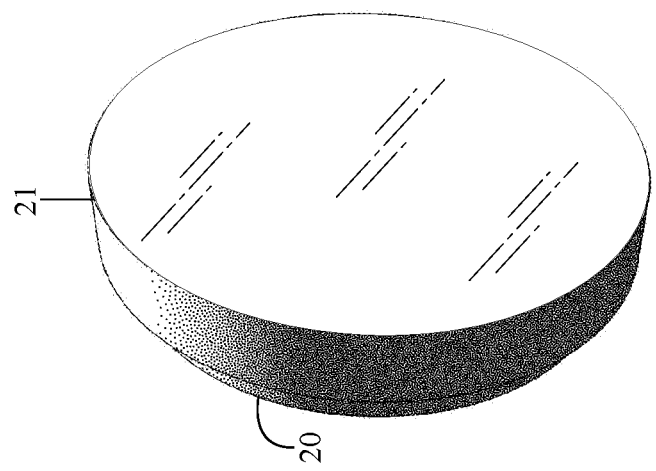
FIG. 27 illustrates an anterior perspective view of the invention's mirror base plate and its secondary mirror.
Figure 26:
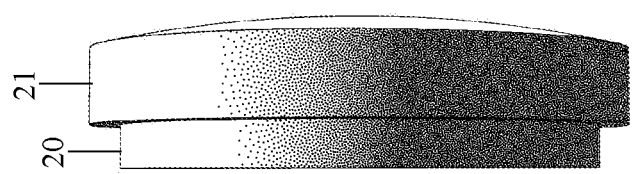
FIG. 26 illustrates a lateral perspective view of the invention's mirror base plate and its secondary mirror.
Figure 25:
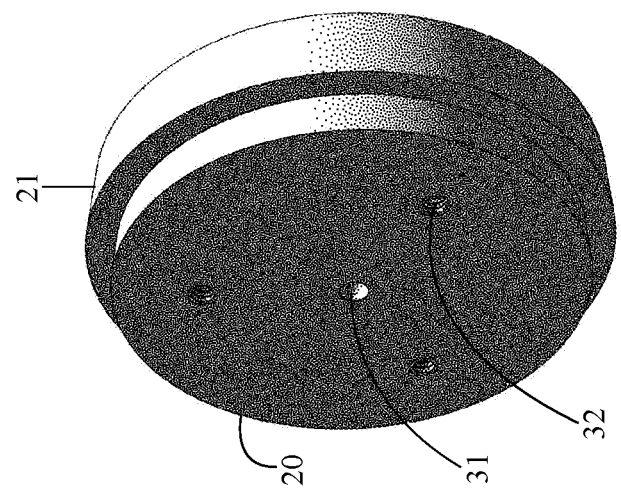
FIG. 25 illustrates a posterior perspective view of the invention's mirror base plate and its secondary mirror.

Accordingly, FIGS. 6, 7 and 8 are varied perspective views of the threaded retention ring 12. FIG. 9 is a perspective view of the rotational lock screw 14; further, FIG. 9 is a perspective view of the collimating knob screws, 13, 13a or 13b, each of which possesses a plurality of grooves 39 that are radially marked at the base of their circumference. FIGS. 10, 11, and 12 are varied perspective views of the collimating faceplate 15, detailing its collimating screw passages 24 for the collimating knob screws, 13, 13a and 13b, and rotational lock screw passage 25 for the rotational lock screw 14. FIGS. 13, 14 and 15 are varied perspective views of the collimating assembly's axle 16, detailing its screw passages 26 for the collimating knob screws, 13, 13a and 13b, and balance point 27 for the secondary mirror's base 20. FIGS. 16, 17 and 18 are varied perspective views of the hub 17, detailing the placement of its rotational lock screw lock points 28, and set screws 29 for centrally fastening the outer race of the assembly's radial bearing 18 (shown in FIG. 32). FIGS. 19, 20 and 21 are varied perspective views of the assembly's radial bearing 18. FIGS. 22, 23 and 24 are varied perspective views of the flanged retention ring 19, and its flange 30, that when threaded onto the posterior face of the axle 16 compresses against the inner race of the assembly's radial bearing 18. FIGS. 25, 26 and 27 are varied perspective views of the convex secondary mirror 21, its fastening base 20, its threaded collimating knob screw fastening points 32, and its spherical balance groove 31 that aligns to the axle's balance point 27.

Figure 28:
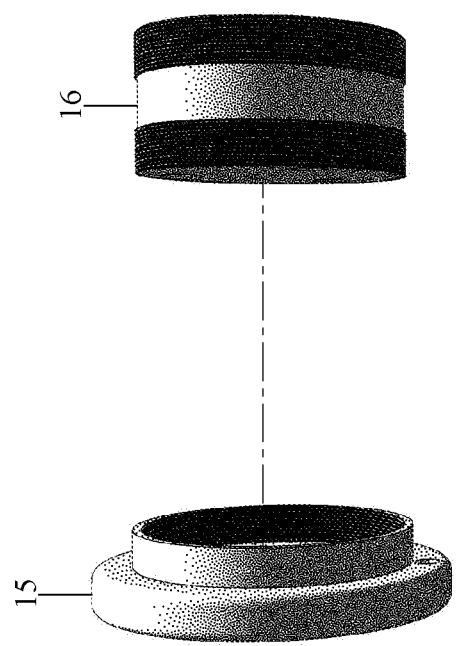
FIG. 28 illustrates a perspective assembly diagram of the invention's collimating faceplate and axle.
Figure 31:
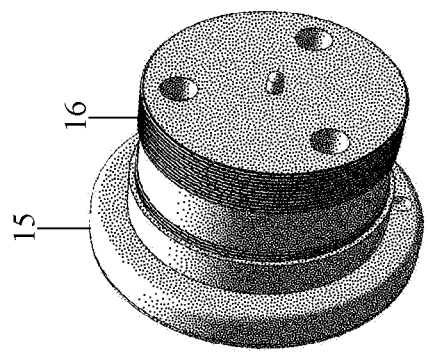
FIG. 31 illustrates a posterior perspective view of an assembled collimating faceplate and axle from FIG. 28.
Figure 30:
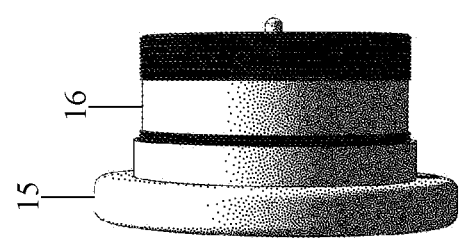
FIG. 30 illustrates a lateral perspective view of an assembled collimating faceplate and axle from FIG. 28.
Figure 29:
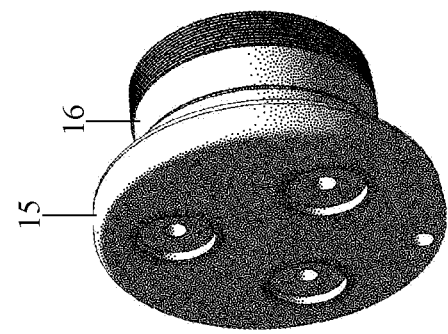
FIG. 29 illustrates an anterior perspective view of an assembled collimating faceplate and axle from FIG. 28.
Figure 36:
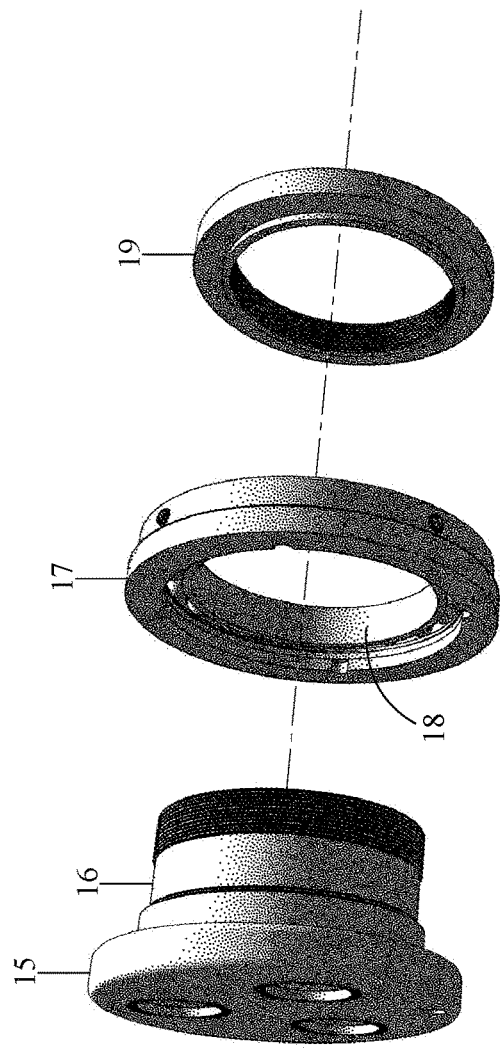
FIG. 36 illustrates a perspective assembly diagram of the invention's collimating faceplate, axle, hub, radial bearing and flanged retention ring.
Figure 39:
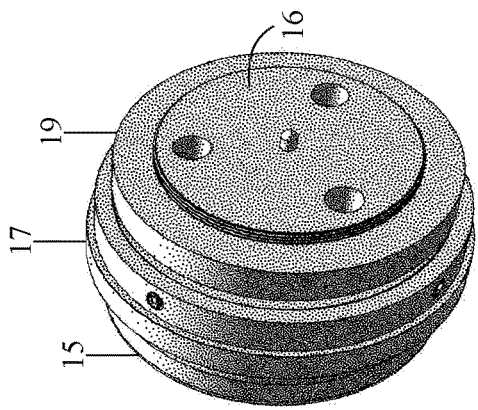
FIG. 39 illustrates a posterior perspective view of an assembled collimating faceplate, axle, hub, radial bearing and flanged retention ring from FIG. 36.
Figure 38:
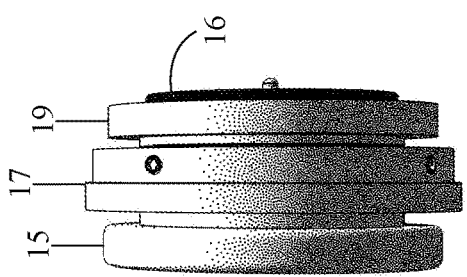
FIG. 38 illustrates a lateral perspective view of an assembled collimating faceplate, axle, hub, radial bearing and flanged retention ring from FIG. 36.
Figure 37:
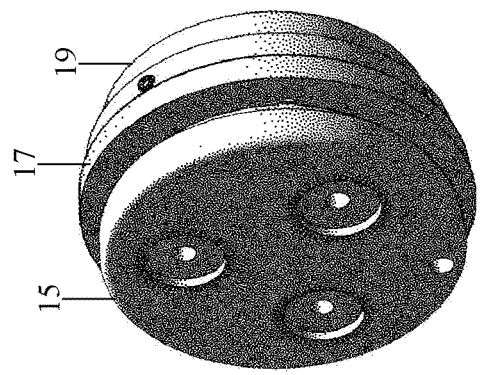
FIG. 37 illustrates an anterior perspective view of an assembled collimating faceplate, axle, hub, radial bearing and flanged retention ring from FIG. 36.

FIG. 28 is a perspective view for the assembly of the collimating faceplate 15 to the axle 16. FIGS. 29, 30 and 31 are varied perspective views of the collimating faceplate 15 assembled to the axle 16. FIG. 32 is a perspective view for the assembly of the hub 17 and its set screws 29 to the radial bearing 18. FIGS. 33, 34 and 35 are varied perspective views of the radial bearing 18 both nested and assembled inside the hub 17. FIG. 36 is a perspective view for the assembly of the collimating faceplate 15, axle 16, hub 17, radial bearing 18 and flanged retention ring 19. FIGS. 37, 38 and 39 are varied perspective views detailing the assembly of the collimating faceplate 15, axle 16, hub 17, radial bearing 18, and flanged retention ring 19. FIG. 40 is a perspective view for the full assembly of the rotational collimating assembly 23 comprised of collimating knob screws, 13, 13a and 13b, a rotational lock screw 14, a collimating faceplate 15, hub 17, radial bearing 18, axle 16, and flanged retention ring 19 and having a secondary mirror 21 and a secondary mirror base plate 20. FIGS. 41, 42 and 43 are varied perspective views of the completed assembly of the rotational collimating assembly 23.

Figure 44:
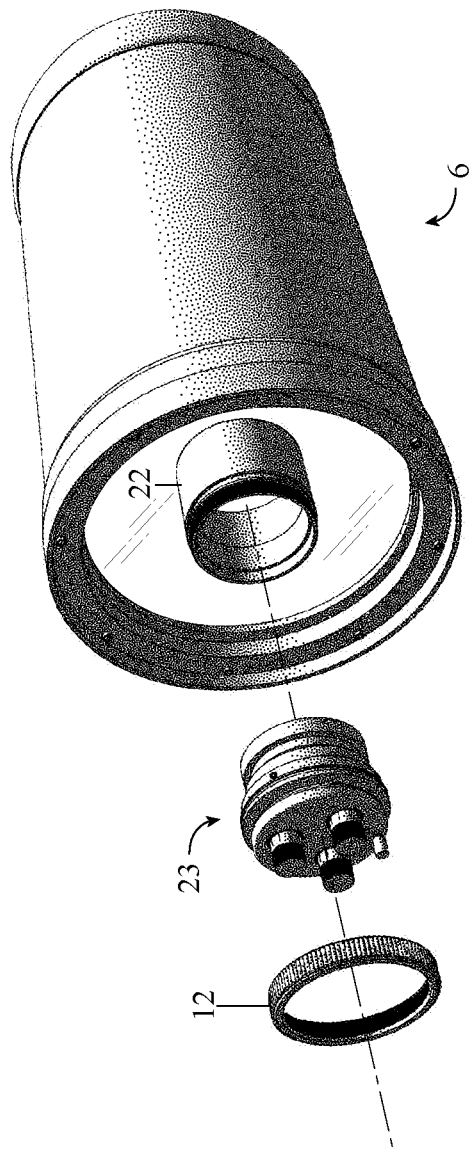
FIG. 44 illustrates a perspective assembly diagram of the invention's knurled retention ring, rotational collimating assembly, secondary mirror baffle and Schmidt-Cassegrain optical tube assembly.
Figure 45:
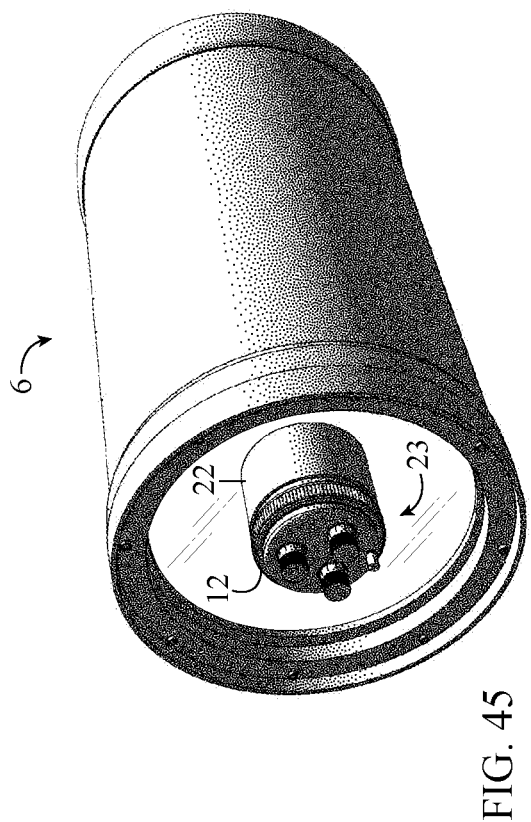
FIG. 45 illustrates an assembled retention ring, rotational collimating assembly, secondary mirror baffle and Schmidt-Cassegrain optical tube assembly from FIG. 44.
Figure 46:
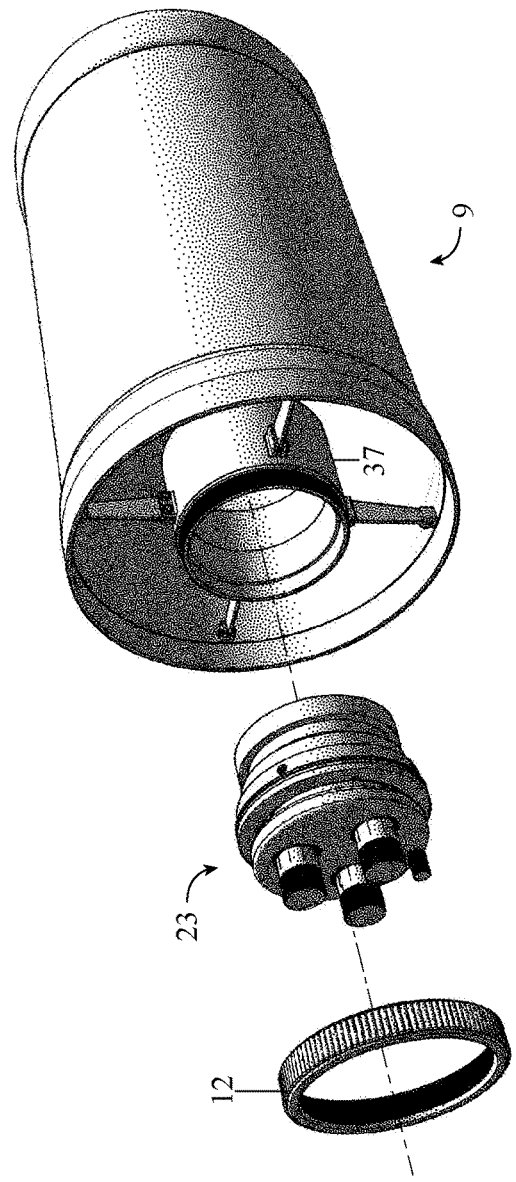
FIG. 46 illustrates a perspective assembly diagram of the invention's knurled retention ring, rotational collimating assembly, secondary mirror baffle and classical Cassegrain optical tube assembly.
Figure 47:
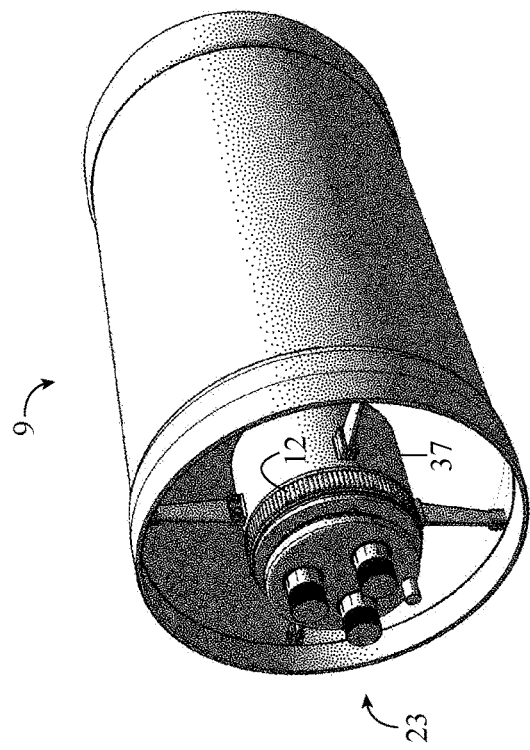
FIG. 47 illustrates an assembled retention ring, rotational collimating assembly, secondary mirror baffle and classical Cassegrain optical tube assembly from FIG. 46.

FIG. 44 is a perspective view detailing the insertion of the rotational collimating assembly 23 into the internal baffle 22 of a Schmidt-Cassegrain optical tube held securely in place with the knurled retention ring 12. FIG. 45 illustrates the rotational collimating assembly 23 fully integrated into the Schmidt-Cassegrain optical tube. FIG. 46 is a perspective view detailing the insertion of the rotational collimating assembly 23 into the internal baffle 37 of a classical Cassegrain optical tube held securely in place with the knurled retention ring 12. FIG. 46 illustrates the rotational collimating assembly 23 fully integrated into the classical Cassegrain optical tube.

Figure 48:
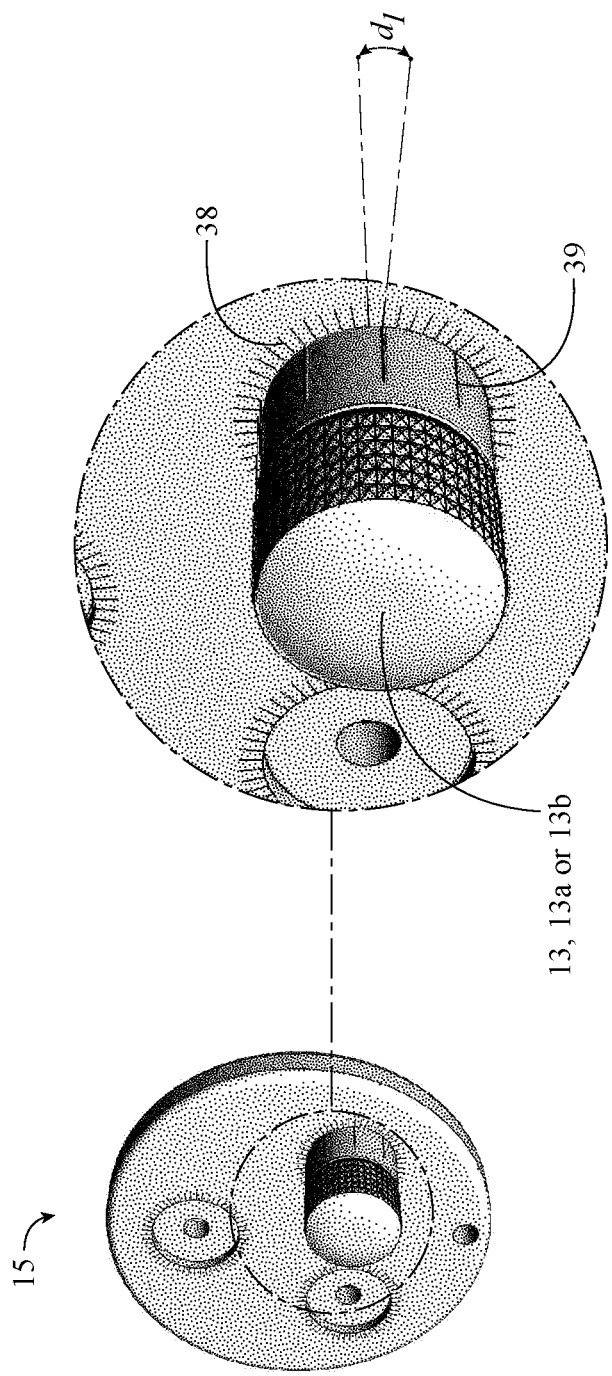
FIG. 48 illustrates how the radial markings on the invention's collimating knob screws may be indexed against the radial markings on the invention's collimating faceplate allowing the user to make discreet arc minute changes in the secondary mirror's position about the telescope's optical axis.
Figure 49:
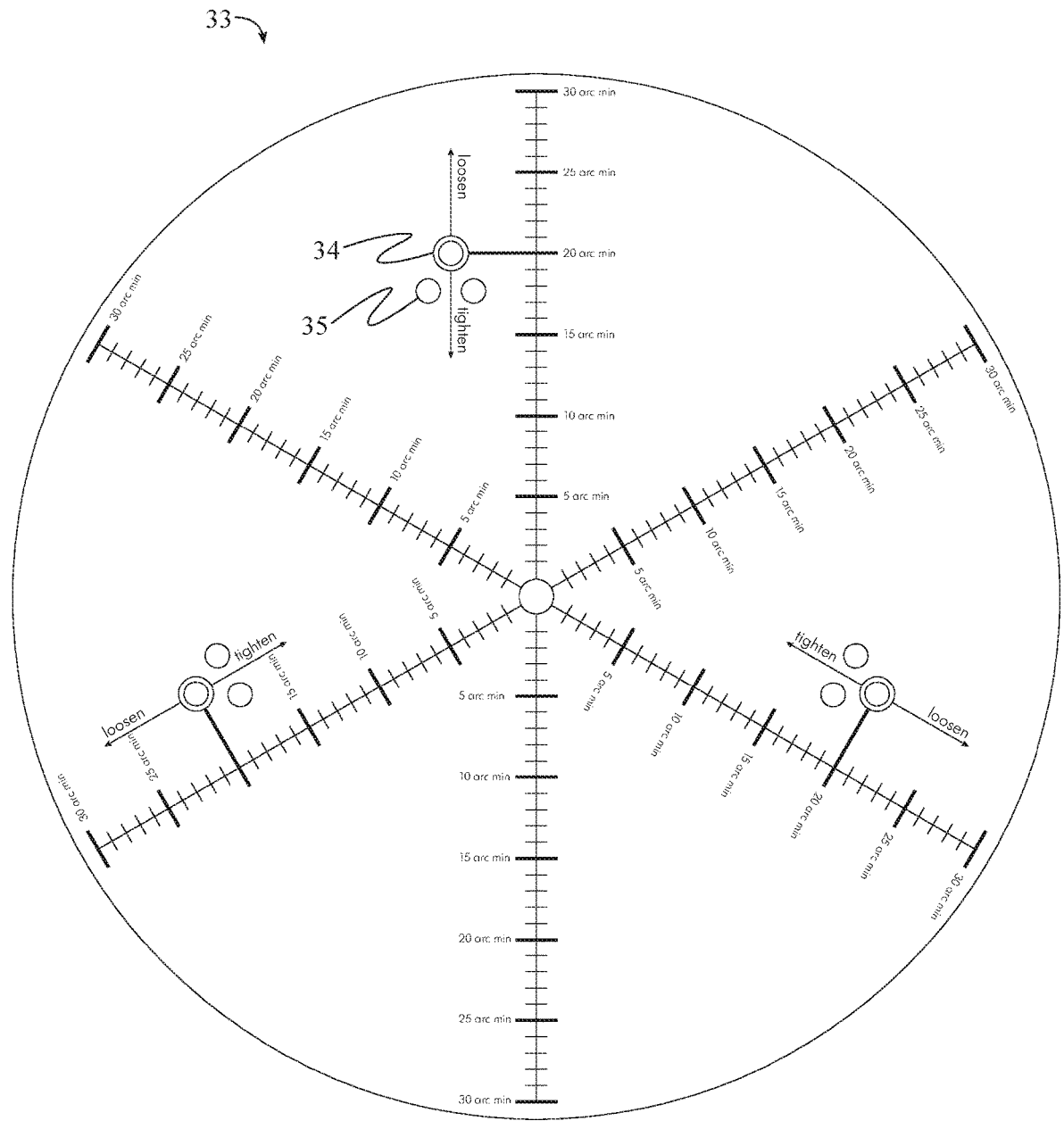
FIG. 49 illustrates the reticle design disclosed in this invention for a low-powered magnifying eyepiece.
Figure 50:
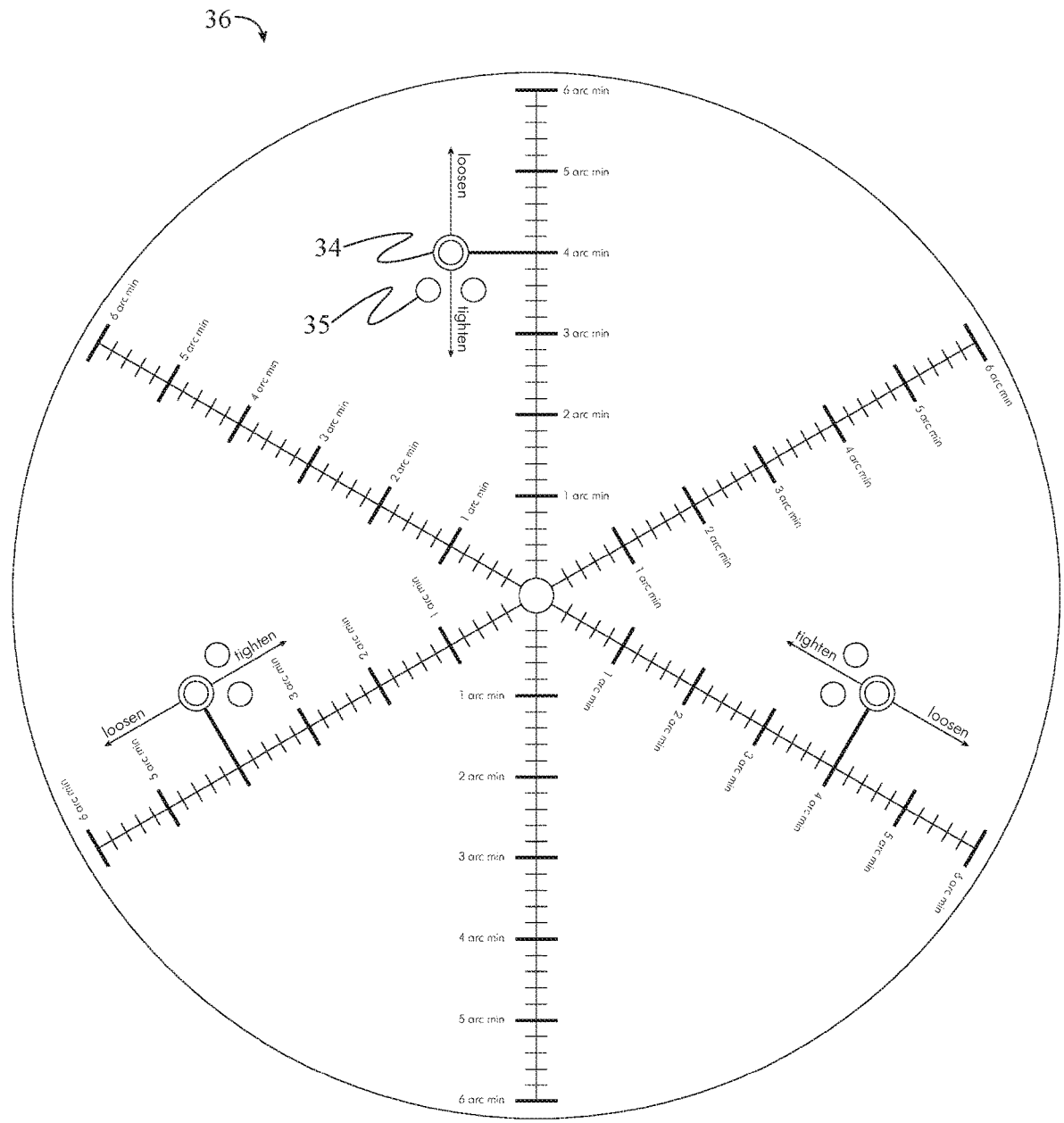
FIG. 50 illustrates the reticle design disclosed in this invention for a high-powered magnifying eyepiece.

FIG. 48 illustrates how the radial markings 39 about the base of each collimating knob screw, 13, 13a or 13b, may be indexed against the radial markings 38 on the collimating faceplate 15 allowing the user to adjust the secondary mirror's position by a specific and discreet distance of $d_1$; the distance $d_1$ corresponds to a positional shift in the secondary mirror 21 of one arc minute. Integral to the radial markings on both the collimating knob screws and collimating faceplate is a reticle design, 33 and 36, that may be visualized by the observer at varying powers through the telescope's eyepieces when collimating the telescope. FIG. 49 is a detailed illustration of the reticule design 33 viewed through a low-powered magnifying eyepiece; FIG. 50 is a detailed illustration of the reticule design 36 viewed through a high-powered magnifying eyepiece. As the low-powered magnifying eyepiece and high-powered magnifying eyepiece allow the viewer to visualize a scene at a differing magnification, the units of measurement on the reticle designs, 33 and 36, have been adjusted to compensate for this change. During collimation of the telescope, the eyepieces and reticle designs allow the observer to both visualize and measure the specific direction and magnitude of image shift, in arc minutes, concurrent to the free rotation of the secondary mirror 21. Once the direction and magnitude of image shift are measured, the reticle design displays a set of guide markings 34, 35 that indicate the specific collimating knob or knobs that require adjustment to collimate the telescope, and if they should be loosened or tightened.

Figure 51:
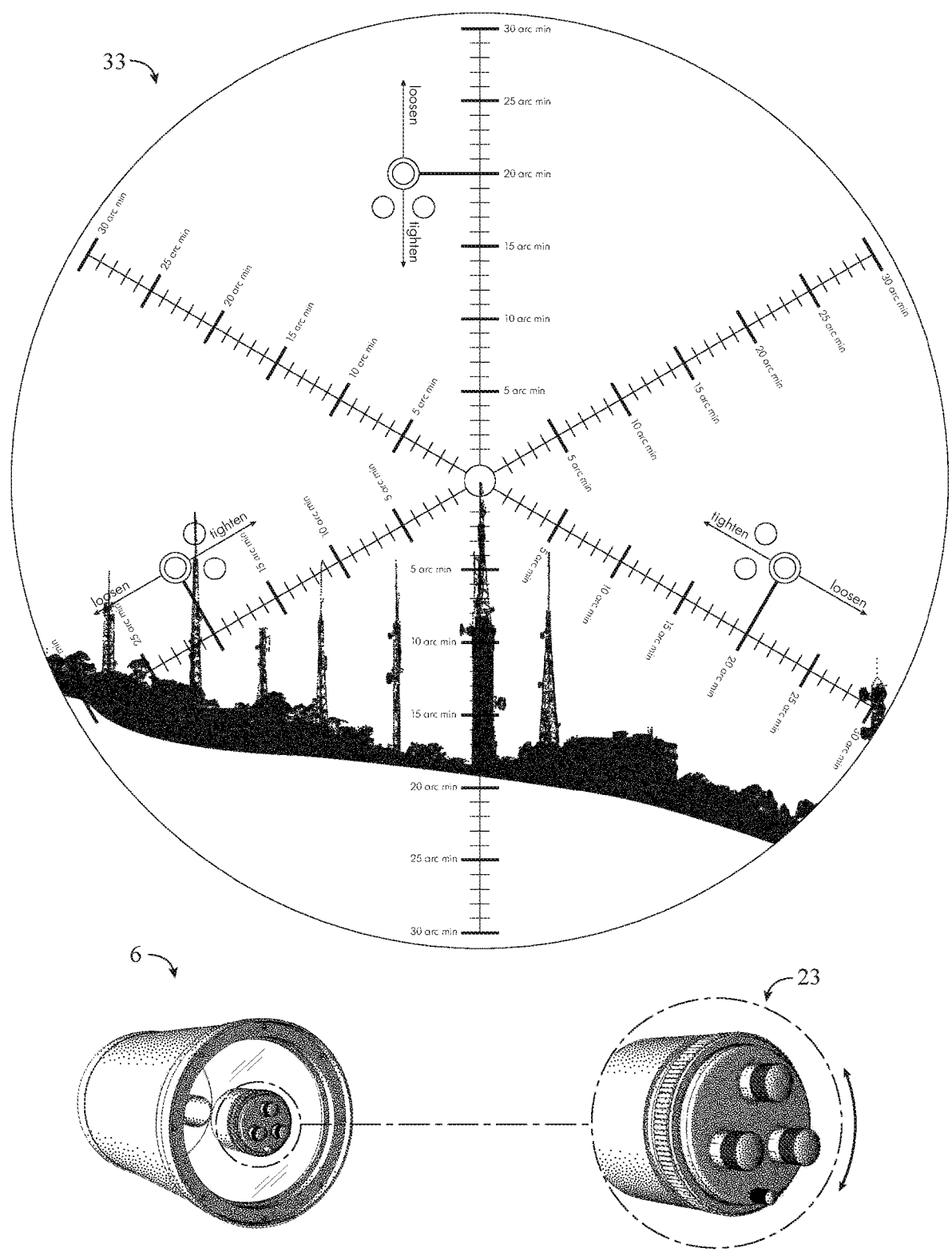
FIG. 51 illustrates the initial reticle view of a bank of radio towers on a hillside visualized through a low-powered magnifying eyepiece.
Figure 52:
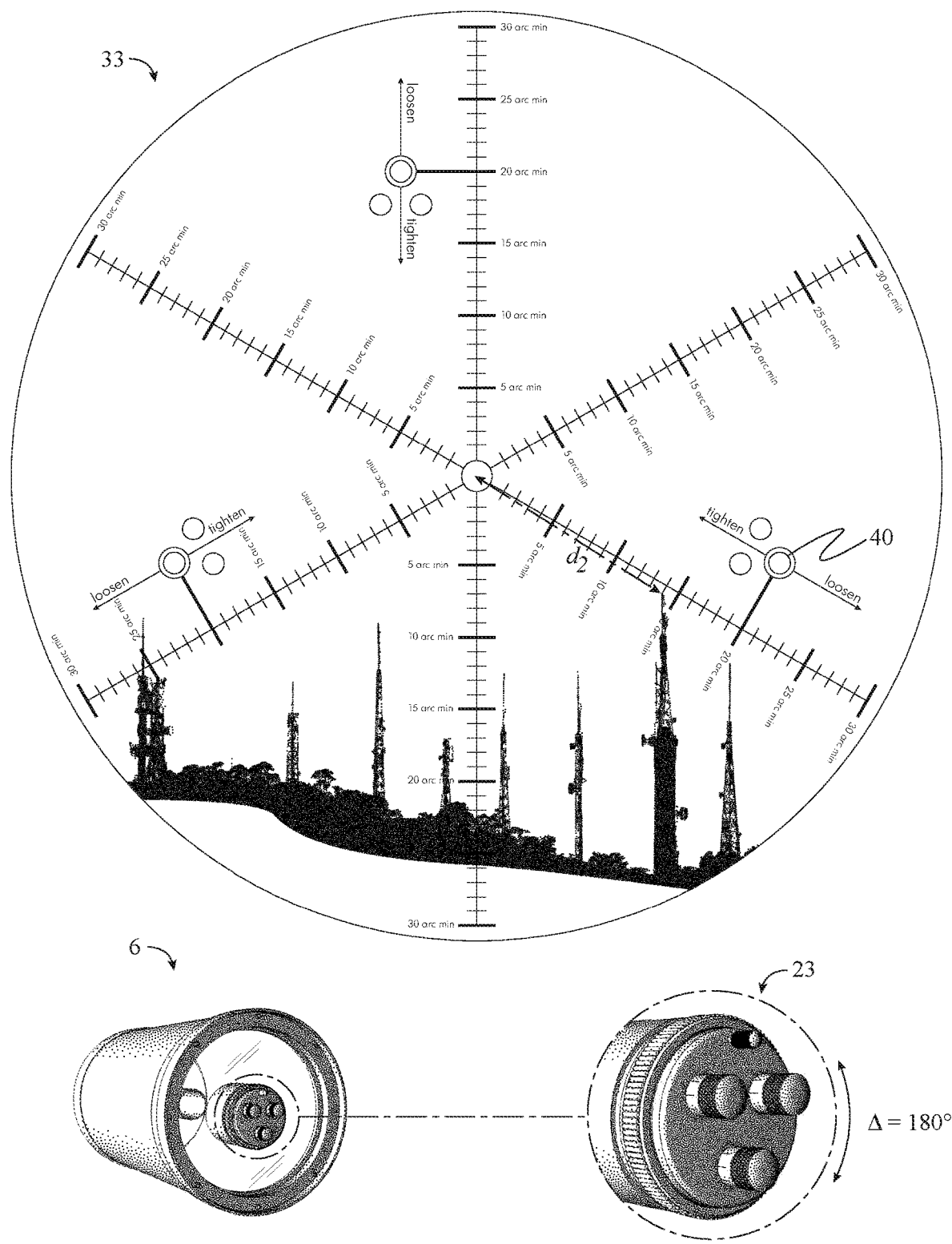
FIG. 52 illustrates the direction and magnitude of image shift of the bank of radio towers on a hillside visualized through the reticle of a low-powered magnifying eyepiece in a poorly collimated Cassegrain telescope whose secondary mirror has been rotated 180° from FIG. 51's initial view.

In one embodiment, should an observer desire to collimate their telescope with the disclosed invention, they may begin the best method by pointing their telescope at a scene of interest and focusing the image to the sharpest view possible. As an example, FIG. 51 illustrates an observer viewing a bank of radio towers on a hillside, visualized through the reticle 33 of a low-powered eyepiece. So that the observer may easily measure the exact direction and magnitude of image shift during the collimation process, they have positioned the tallest radio tower spire into the center of the eyepiece's reticle design 33. At this point, the observer will disengage the rotational lock screw 14, rotate the collimating assembly 23 180°, re-engage the rotational lock screw 14, and observe the direction and magnitude of image shift through the telescope's eyepiece aided by the reticle 33. In this example, FIG. 52, the radio tower spire has moved from its centered position to a point that is approximately 14 arc minutes $d_2$ from center at the 4 o'clock position. From this, the observer now knows that the secondary mirror is 14 arc minutes out of collimation with the primary mirror and the corresponding collimating knob screw that should be adjusted to compensate for this misalignment. The observer can now tighten the requisite collimating knob indicated by the reticle markings 40 the specific increment required, per the radial arc minute markings, 38 and 39, on both the collimating knob screws, 13, 13a or 13b, and collimating faceplate 15, to align the telescope's mirrors. To assess changes made to the telescope's collimation, the observer may repeat the previous sequence of actions until they are unable to discern any shift in the image as visualized through the low-powered eyepiece; the image stays centered in the reticle design 33 as they rotate or spin the mirror about the telescope's visual axis. However, the telescope's collimation may still be improved.

Figure 53:
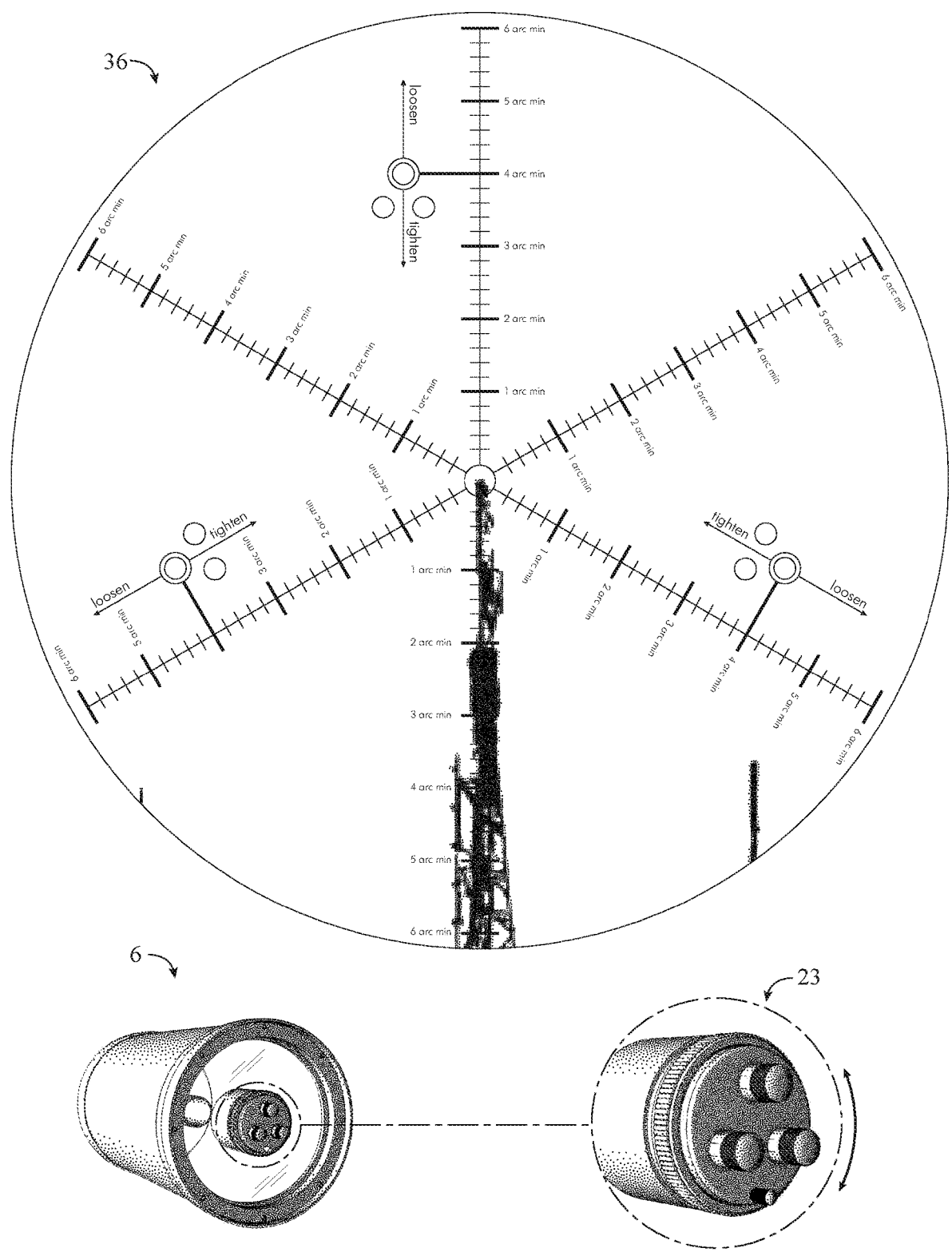
FIG. 53 illustrates the initial reticle view of a bank of radio towers on a hillside through the reticle of a high-powered magnifying eyepiece in a partially collimated Cassegrain telescope.
Figure 54:
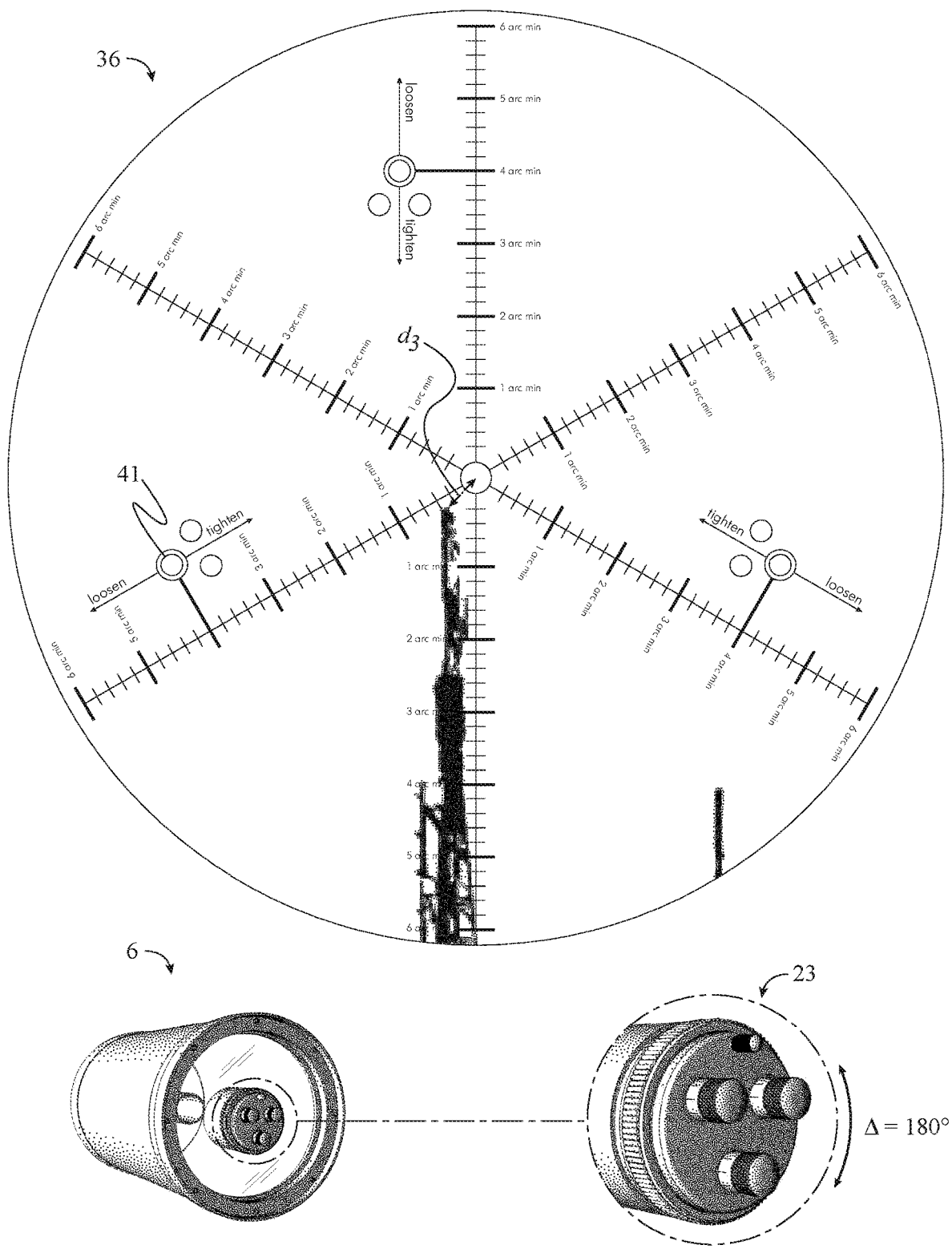
FIG. 54 illustrates the direction and magnitude of image shift of the bank of radio towers on a hillside visualized through the reticle of a high-powered magnifying eyepiece in a partially collimated Cassegrain telescope whose secondary mirror has been rotated 180° from FIG. 53's initial view.

Exchanging the initial low-powered eyepiece used for a high-powered eyepiece that reaches the telescope's maximum useful magnification (FIG. 53), the observer continues the collimation process. The radio spire now appears much larger in the high-powered eyepiece and very fine adjustments to the telescope's collimation are possible. Again, repeating their previous actions, the user centers the radio spire in the reticle design 36, rotates the secondary mirror 180°, and peers back into the telescope's eyepiece (FIG. 54). Aided by the reticle design 36, the observer discerns that the image has shifted by a small amount of 30 arc seconds $d_3$ towards the 8 o'clock position. To accommodate for the now slight misalignment in the telescope's secondary mirror, the observer adjusts the requisite collimating knob 41, turning it an increment of half an arc minute as marked on the collimating faceplate 15, adjusting the secondary mirror's alignment. Continuing the collimation process with this method, the observer will eventually be unable to discern any directional shift in the telescope's image as they manually rotate or freely spin the secondary mirror. The telescope is now collimated to the most precise tolerances achievable at its highest useful magnification. The observer can now spin the secondary mirror, allowing it to freely rotate on its own for several seconds, and observe an image that has no discernable shift or wobble to it at any useful magnification the telescope may achieve. The act of freely spinning the secondary mirror and concurrently assessing the image for the slightest shift or wobble can be done at any time allowing the observer to quickly asses the accuracy of their telescope's collimation in any setting day or night. On nights of poor seeing conditions where the atmosphere is the source of visual aberrations, this facet of the invention enables the observer to rule out the telescope's collimation as the potential source of any visual aberrations and be confident that the telescope's mirrors are producing the best possible image under the specific atmospheric conditions encountered.

From this disclosure, it will be recognized by individuals skilled in the art that modifications may be made to various facets of the invention, both in assembly design and method, to achieve the desired outcome of collimating a focused Cassegrain telescope by manually rotating or freely spinning the secondary mirror about the telescope's optical axis, concurrently measuring the image's direction and magnitude of shift through a reticle in the telescope's eyepiece, and correspondingly adjusting the secondary mirror's alignment to the primary mirror. As such, it is understood that the invention is not limited solely to the physical specificities or methods disclosed and that other derivations which capture and embody the spirit of the invention are possible.

The invention claimed is:

1. An apparatus for collimating a Cassegrain telescope, comprising:
    a first plate member, wherein the first plate member comprises at least three openings;
    a second cylindrical member coupled to the first plate member, wherein the second cylindrical member comprises at least three openings, wherein the three openings of the second cylindrical member and the three openings of the first plate member are axially aligned;
    a plurality of third adjustment members, wherein the third adjustment members are received through the three openings of the first plate member and the three openings of the second cylindrical member;
    a fourth ring member, wherein the fourth ring member is at least partially coupled to the second cylindrical member; and
    a fifth ring member, wherein the fifth ring member is at least partially secured within the fourth ring member, and wherein the fourth and fifth ring members are disposed over and engaged with an outer surface of the second cylindrical member.

2. The apparatus of claim 1, wherein the fifth ring member is at least partially secured within the fourth ring member via a plurality of threaded fasteners.

3. The apparatus of claim 2, wherein the fifth ring member is comprised of a bearing.

4. The apparatus of claim 1, further comprising:
    a sixth ring member, wherein the sixth ring member is coupled to the second cylindrical member, thereby securing the fourth and fifth ring members.

5. The apparatus of claim 4, wherein the plurality of third adjustment members are configured to threadably engage at least three openings of a secondary mirror of the Cassegrain telescope, thereby coupling the first plate member, second cylindrical member, fourth ring member, fifth ring member, and the sixth ring member to the secondary mirror.

6. The apparatus of claim 1, wherein each of the three openings of the first plate member comprise indicia or markings.

7. The apparatus of claim 6, wherein each of the third adjustment members comprise a head, and wherein each head of the third adjustment members correspond to the respective indicia or markings of the three openings of the first plate member.

8. The apparatus of claim 1, wherein the first plate member comprises a plurality of radial markings, and wherein a distance between each radial marking corresponds to one arc minute.

9. The apparatus of claim 8, wherein the first plate member is adapted to rotate about an axis.

10. The apparatus of claim 9, further comprising:
    a fastening member coupled to the first plate member, wherein the fastening member is adapted to lock the first plate member or unlock the first plate member.

11. An apparatus for collimating a Cassegrain telescope, comprising:
    a plate member, wherein the plate member comprises a first opening;
    a block member coupled to the plate member, wherein the block member comprises a second opening, wherein the first and second openings are substantially axially aligned with respect to each other;
    an adjustment member, wherein the adjustment member is received within the first opening of the plate member and the second opening of the block member;
    a ring member, wherein the ring member is at least partially coupled to the block member;
    a bearing member, wherein the bearing member is at least partially secured to the ring member, and wherein the ring member and bearing member are disposed over an outer surface of the block member; and
    a retention member, wherein the retention member is coupled to the block member via a threaded engagement, such that the ring member and bearing member are disposed between the retention member and the plate member, and wherein the adjustment member is configured to secure to a secondary mirror of the Cassegrain telescope, such that the secondary mirror is configured to be collimated via the adjustment member.

12. The apparatus of claim 11, wherein the bearing member is at least partially secured to the ring member via a plurality fasteners around the ring member.

* * * * *